United States Patent
Goldbach et al.

(10) Patent No.: US 7,886,881 B2
(45) Date of Patent: Feb. 15, 2011

(54) DISC BRAKE COMPRISING A LINING SUPPORT

(75) Inventors: Dieter Goldbach, Bad Homburg (DE); Michael Spukti, Weilmünster (DE)

(73) Assignee: Goldbach Automobile Consulting GmbH, Rosbach (DE)

( * ) Notice: Subject to any disclaimer, the term of this patent is extended or adjusted under 35 U.S.C. 154(b) by 915 days.

(21) Appl. No.: 10/537,365

(22) PCT Filed: Jan. 29, 2003

(86) PCT No.: PCT/EP03/00884

§ 371 (c)(1),
(2), (4) Date: Jun. 2, 2005

(87) PCT Pub. No.: WO2004/051110

PCT Pub. Date: Jun. 17, 2004

(65) Prior Publication Data

US 2006/0049012 A1    Mar. 9, 2006

(30) Foreign Application Priority Data

Dec. 5, 2002   (DE) ............................... 102 57 092
Dec. 6, 2002   (DE) ............................... 102 57 353

(51) Int. Cl.
    *F16D 69/00*    (2006.01)
(52) U.S. Cl. .............. 188/251 R; 188/250 R; 188/250 G; 188/250 D
(58) Field of Classification Search ............ 188/250 G, 188/250 B, 250 R, 250 D
    See application file for complete search history.

(56) References Cited

U.S. PATENT DOCUMENTS

| | | | | |
|---|---|---|---|---|
| 1,239,448 A | * | 9/1917 | Armbrust | 188/255 |
| 1,789,133 A | * | 1/1931 | Bluhm | 188/250 G |
| 1,844,461 A | * | 2/1932 | Chase | 188/250 G |
| 1,876,811 A | * | 9/1932 | Whitworth | 188/250 G |
| 3,198,294 A | * | 8/1965 | Stacy | 188/234 |
| 3,695,654 A | * | 10/1972 | Meyer | 411/448 |
| 3,767,018 A | | 10/1973 | Gordon | |
| 3,982,612 A | * | 9/1976 | Krupka | 188/73.1 |
| 4,029,181 A | * | 6/1977 | Lewis | 188/250 B |
| 4,146,118 A | * | 3/1979 | Zankl | 188/250 G |
| 4,235,314 A | * | 11/1980 | Reagan | 188/73.38 |
| 5,255,762 A | | 10/1993 | Beri | |
| 5,555,959 A | * | 9/1996 | Everett | 188/73.1 |
| 5,558,186 A | | 9/1996 | Hyde et al. | |
| 5,597,053 A | * | 1/1997 | Weng | 188/256 |
| 5,816,370 A | * | 10/1998 | Verbeeten et al. | 188/250 G |
| 5,842,546 A | * | 12/1998 | Biswas | 188/73.37 |
| 5,896,955 A | * | 4/1999 | Everett | 188/24.12 |
| D426,181 S | * | 6/2000 | Everett | D12/180 |
| 6,851,527 B2 | * | 2/2005 | Hoffrichter et al. | 188/251 A |

FOREIGN PATENT DOCUMENTS

DE   41 04 812    8/1992
EP   0 373 333    6/1990

* cited by examiner

*Primary Examiner*—Bradley T King
*Assistant Examiner*—James K Hsiao
(74) *Attorney, Agent, or Firm*—Bachman & LaPointe, P.C.

(57) ABSTRACT

A disk brake, particularly a brake pad comprising a lining support and a friction lining. At least one pin is mounted on the lining support and serves top fix the friction lining. The pin should pass through the friction lining from approximately the middle while extending approximately up to the lining surface.

9 Claims, 1 Drawing Sheet

DISC BRAKE COMPRISING A LINING SUPPORT

BACKGROUND OF THE INVENTION

The invention relates to a disk brake, in particular a brake pad, comprising a lining support and a friction lining, at least one stud being mounted on the lining support and serving to fix the friction lining, and to a method for the manufacture thereof.

Such disk brakes having brake pads are known in various forms and designs. Reference is made, for example, to EP-A 0 373 333 or DE 41 04 812 A1. In such disk brakes the lining support is composed of steel. For the friction lining there are a number of formulae primarily intended to minimize the brake wear and to improve the brake performance.

U.S. Pat. No. 5,255,762 furthermore discloses a brake shoe in which a nut is seated in the friction lining. In order to reduce the friction lining with the lining support, a bolt is screwed into the nut, passing through a corresponding opening in the lining support. U.S. Pat. No. 5,558,186 and U.S. Pat. No. 3,767,018, for example, set forth a riveted connection between friction lining and lining support.

The object of the present invention is to develop a disk brake with brake pads and a method for the manufacture of a brake pad, which simplifies the manufacture and significantly improves the quality thereof. It is furthermore intended to improve the compressibility of the friction lining and to influence a surface tension of the lining. It is furthermore intended to improve the production costs considerably by means of an optimized method of manufacture affording greater solidity between studs and lining support, even at high temperatures and under varying vibrations of the friction lining.

DE 298 04 619 U1 describes a brake shoe for a disk brake, in which individual studs protrude from a support plate for attaching and fixing the brake lining. In this case the studs extend in an axial direction for only 1 mm to 3 mm from the support plate, abrasion of the brake lining being possible only down to the surface of the stud.

DE 41 26 197 A1 discloses a floating caliper disk brake having a brake shoe arrangement, a pin protruding from one end of the backing plate and being bonded to the actual brake lining on an opposite side of the backing plate.

DE 100 55 796 A1 discloses a brake lining for a friction brake, in which a friction lining section of a different material is used inside a friction lining. This acts as a spring element.

SUMMARY OF THE INVENTION

The object is achieved by the present invention wherein it has proved particularly advantageous to select a stud length which passes tight through the friction lining, the stud preferably engaging in the friction lining up to the lining surface or to half the thickness of the friction lining. It is also intended, however, to encompass all possible stud lengths situated in the range between the middle of the friction lining and the surface of the lining.

Since the stud is formed from a soft non-ferrous metal, preferably from a soft brass, in particular MS 60, this stud can be abraded by the brake disk with the friction lining without thereby adversely affecting the brake performance.

Forming a stud length between half the thickness of the friction lining and the full thickness of the friction lining in particular creates a substantially greater and optimized friction lining compressibility, the intention here also being to influence the surface tension of the lining. These long studs prevent the generation of unwanted braking noise when braking by means of the brake pad opposite the brake disk.

It is particularly important that the stud, which is exposed to a high temperature, forms a high-strength connection with the lining support. It has proved particularly advantageous in the present invention, in order to achieve a highly temperature and vibration-resistant solidity or connection between the stud and the lining support, to design the stud as a capacity discharge stud or drawn arc stud and to firmly weld or join the stud to the lining support by means of an automated capacity discharge welding process or drawn arc welding process. The capacity discharge welding process or the drawn arc welding process may be performed with or without gas shield and ensures a solid connection of the brass or non-ferrous metal stud to the lining support, preferably made of steel, even at high brake pad operating temperatures and under high natural vibrations of the friction lining in the braking sequence. Moreover, this simplifies the production process and reduces production costs.

Welding the studs onto the lining support by means of an automated laser welding process also comes within the scope of the present invention. In this case the soft brass stud is firmly joined to the steel or titanium lining support and ensures a high-strength and temperature-resistant connection that is insensitive to vibration. The automated laser welding process can also reduce manufacturing times considerably. It is proposed that this should likewise come within the scope of the present invention.

BRIEF DESCRIPTION OF THE DRAWINGS

Further advantages, features and details of the invention are set forth in the following description of preferred exemplary embodiments and with reference to the drawings, in which.

DETAILED DESCRIPTION

Figure 1:
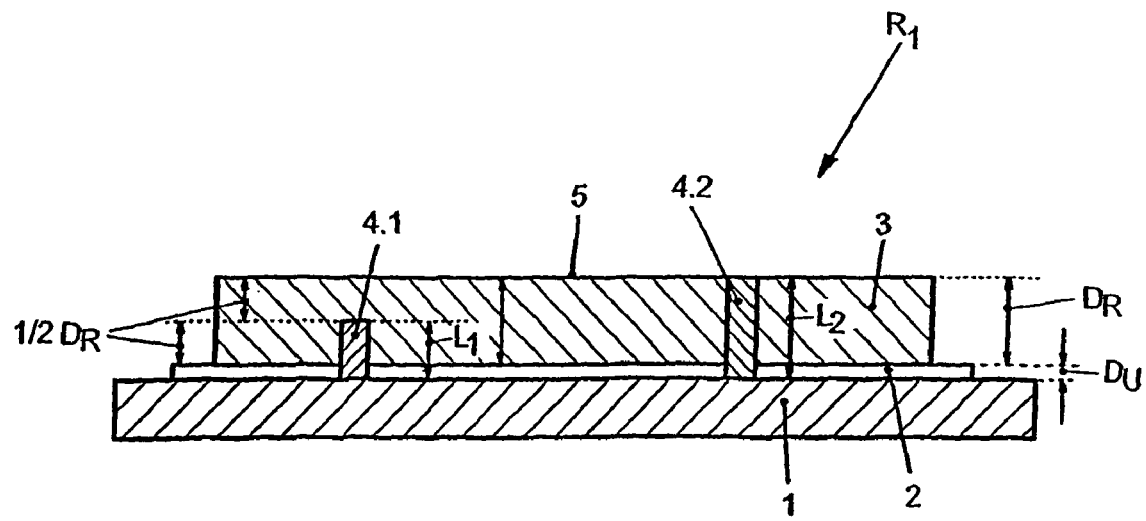
FIG. 1 shows a cross-section through a brake pad for a disk brake.

FIG. 1 shows a cross-section through a disk brake, not represented in further detail here, in which a brake pad $R_1$ is pressed radially against the disk brake by means of brake calipers and brake pistons not represented further here. The brake pad $R_1$ basically comprises a lining support 1, on which a so-called underlayer 2 is adhesively bonded. The actual friction lining 3 is bonded onto the underlayer 2 and/or firmly connected to the underlayer 2.

The underlayer 2 may be dispensed with since the friction layer 3 is directly bonded onto the lining support 1.

In the case of the present invention it is particularly important that at least one stud 4.1 to 4.4 be firmly connected to the lining support 1, in particular firmly welded thereto. The stud 4.1 to 4.4, as also represented in FIG. 2, is made from a soft material, in particular from a soft brass, preferably MS 60, and is firmly welded to the lining support 1, preferably made of steel.

Figure 2:
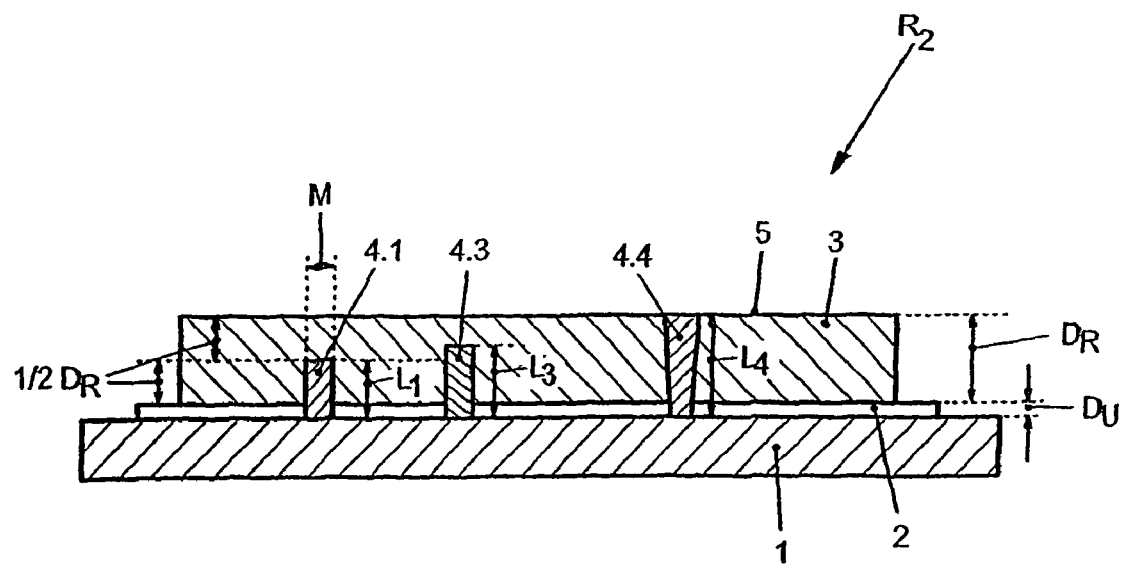
FIG. 2 shows a schematic cross-section through a further exemplary embodiment of a further brake pad for a disk brake.

If the brake pad $R_1$ or $R_2$, as represented in FIG. 2, comprises the lining support 1, the underlayer 2 and adjoining friction lining 3, the stud 4.1 to 4.4 passes right through the underlayer 2.

It has proved particularly advantageous in the case of the present invention to design the stud with a stud length $L_2$, see FIGS. 1 and 2, which is equal to at least half the thickness $D_R$ of the friction lining 3 plus, where necessary, the thickness $D_U$ of the underlayer 2. The minimum stud length $L_1$ is equal to half the thickness $D_R$ of the friction lining 3 plus the thickness $D_U$ of the underlayer 2. The stud length $L_2$ of the stud 4.2 is equal to the entire thickness $D_R$ of the friction lining 3 plus, where necessary, the thickness of the underlayer $D_U$.

The stud 4.2 passes right though the lining support 1 to the lining surface 5. Since the stud 4.2 and also 4.4, see FIG. 2, which is of a conically widened rather than a cylindrical shape, is formed from a softer material than the friction lining 3 itself or the brake disk, this is abraded together with the friction lining 3.

Forming a stud length $L_3$, which lies in the ranges between half the thickness $D_R$ of the friction lining 3 and the entire thickness $D_R$ of the friction lining 3, as is shown or indicated in the stud 4.3, also comes within the scope of the present invention, as can be seen from FIG. 2. If a bolt length $L_1$ to $L_4$ is selected which lies in these ranges, therefore, this results in a number of advantages and possible ways of advantageously influencing the brake pad $R_1$, $R_2$. In particular the surface tension of the lining of the brake pad $R_1$, $R_2$ can be influenced through the choice of the diameter M of the stud 4.1 to 4.4, the shape of the stud 4.1 to 4.4 and in particular through the stud length $L_1$ to $L_4$. Moreover the friction lining compressibility can in this way be influenced or optimized through the choice of stud length between $L_1$ and $L_4$.

In particular, this improves the durability and the temperature resistance of the brake pad $R_1$, $R_2$ considerably.

It has further proved advantageous to design the stud 4.1 to 4.2 as a capacitor discharge stud or a drawn arc stud, in order to incorporate this into a production process and to weld this firmly to the lining support 1 by means of a capacitor discharge welding process or a drawn arc welding process. This allows the production process to be optimized to a considerable extent, making it possible also to improve the durability of the same brass stud 4.1 to 4.2 with the lining support 1 substantially while reducing the production costs.

For this reason it has proved particularly advantageous to weld the studs 4.1 to 4.2, made from brass or such an alloy of a soft non-ferrous metal, firmly to the lining support 1 in the capacitor discharge welding process or the drawn arc welding process.

This welded connection between the stud 4.1 to 4.4 and the lining support 1 is therefore important, since the friction lining 3 is exposed not only to high temperatures but also to vibrations. According to the invention, therefore the capacitor discharge welding process or drawn arc welding process with or without a gas shield produces an optimized welded connection between the stud 4.1 to 4.4 and the lining support 1.

The invention claimed is:

1. A disk brake comprising a brake pad having a lining support formed of a first material selected from the group consisting of steel and titanium and a friction lining having a lining surface, a plurality of studs of a second material comprising a non-ferrous metal selected from the group consisting of brass which is softer than the first material, the studs having a first end and an opposed second end, the first end is fixed to the lining support to ensure a high-strength and temperature-resisting connection that is insensitive to vibration, wherein at least one of the studs passes through a hole in the friction lining up to the lining surface, wherein the second end of the at least one stud abrades with the friction lining during braking.

2. The disk brake as claimed in claim 1, wherein the stud is welded onto the lining support.

3. The disk brake as claimed in claim 1, wherein the stud is a capacitor discharge stud or drawn arc stud.

4. The disk brake as claimed in claim 1, wherein an underlayer is provided between the lining support and the friction lining.

5. The disk brake as claimed in claim 1, including a plurality of studs, wherein the studs are formed of a stud length ($L_1$ to $L_4$) which lies in the range from half the thickness $D_R$ of the friction lining to the full thickness $D_R$ of the friction lining in order to influence the lining surface tension and/or the friction lining compressibility of the friction lining.

6. The disk brake as claimed in claim 1, wherein the lining support is formed from a metal plate.

7. A disk brake comprising a brake pad having a lining support formed of a first material selected from the group consisting of steel and titanium and a friction lining having a lining surface, a plurality of studs of a second material comprising of brass which is softer than the first material, having a first end fixed to the lining support to ensure a high-strength and temperature-resisting connection that is insensitive to vibration, wherein at least one stud passes through a hole in the friction lining up to the lining surface, wherein the stud has a second end and abrades with the friction lining during braking.

8. The disk brake as claimed in claim 7, wherein the stud is a capacitor discharge stud or drawn arc stud.

9. The disk brake as claimed in claim 7, wherein the studs are formed from a stud length ($L_1$ to $L_4$) which lies in the range from half the thickness $D_R$ of the friction lining to the full thickness $D_R$ of the friction lining in order to influence the lining surface tension and/or the friction lining compressibility of the friction lining.

* * * * *